(12) United States Patent
Hefeeda

(10) Patent No.: US 9,971,882 B2
(45) Date of Patent: May 15, 2018

(54) SYSTEM AND METHOD FOR MULTIMEDIA CONTENT PROTECTION ON CLOUD INFRASTRUCTURES

(71) Applicant: Qatar Foundation, Doha (QA)

(72) Inventor: Mohamed Hefeeda, Doha (QA)

(73) Assignee: Qatar Foundation, Doha (QA)

( * ) Notice: Subject to any disclaimer, the term of this patent is extended or adjusted under 35 U.S.C. 154(b) by 45 days.

(21) Appl. No.: 14/430,652

(22) PCT Filed: Sep. 24, 2012

(86) PCT No.: PCT/EP2012/068781
§ 371 (c)(1),
(2) Date: Mar. 24, 2015

(87) PCT Pub. No.: WO2014/044331
PCT Pub. Date: Mar. 27, 2014

(65) Prior Publication Data
US 2015/0294094 A1 Oct. 15, 2015

(51) Int. Cl.
*G06F 21/16* (2013.01)
*G06F 21/10* (2013.01)

(52) U.S. Cl.
CPC ............ *G06F 21/16* (2013.01); *G06F 21/105* (2013.01); *G06F 2221/0737* (2013.01)

(58) Field of Classification Search
None
See application file for complete search history.

(56) References Cited

U.S. PATENT DOCUMENTS

| 7,917,484 | B1 | 3/2011 | Vermeulen et al. |
| 8,682,651 | B2* | 3/2014 | Diggins .................. G10L 25/00 704/200 |
| 8,864,581 | B2* | 10/2014 | Leyvand .................. A63F 9/24 382/103 |
| 2008/0178302 | A1 | 7/2008 | Brock et al. |
| 2008/0313140 | A1 | 12/2008 | Pereira et al. |
| 2010/0318759 | A1 | 12/2010 | Hamilton et al. |
| 2011/0064262 | A1 | 3/2011 | Chen et al. |
| 2011/0145393 | A1 | 6/2011 | Ben-Zvi et al. |
| 2011/0314144 | A1* | 12/2011 | Goodman .............. G06Q 10/06 709/224 |

(Continued)

FOREIGN PATENT DOCUMENTS

WO   WO 2004/077265 A2   9/2004

OTHER PUBLICATIONS

Bentley, "Multidimensional Binary Search Trees used for Associative Searching," Communications of the ACM, vol. 18, No. 9, pp. 509-517, 1975, 9 pgs.

(Continued)

*Primary Examiner* — Simon Kanaan
(74) *Attorney, Agent, or Firm* — Martin & Ferraro, LLP

(57) ABSTRACT

A system and method for multimedia content protection on elastic cloud infrastructures is presented. The system can be used to protect various multi-media contents, including regular 2D videos, new 3D videos, animated graphics, images, audios clips, songs, and music clips. The system can run on private clouds, public clouds, or any combination of public-private clouds. The system is scalable and cost effective.

15 Claims, 3 Drawing Sheets

(56) References Cited

U.S. PATENT DOCUMENTS

| | | | | |
|---|---|---|---|---|
| 2012/0254619 A1* | 10/2012 | Dhuse | .................. | H04L 9/085 |
| | | | | 713/176 |
| 2013/0034337 A1* | 2/2013 | Hefeeda | ................ | H04N 5/913 |
| | | | | 386/252 |
| 2015/0195092 A1* | 7/2015 | Bartkiewicz | .......... | H04L 9/3247 |
| | | | | 713/176 |
| 2015/0230061 A1* | 8/2015 | Srivastava | ............ | H04W 4/043 |
| | | | | 705/324 |
| 2015/0310188 A1* | 10/2015 | Ford | ...................... | G06F 21/10 |
| | | | | 726/28 |
| 2015/0326572 A1* | 11/2015 | Oyman | ............ | H04N 21/23439 |
| | | | | 726/4 |

OTHER PUBLICATIONS

Chaisorn et al., "A Fast and Efficient Framework for Indexing and Detection of Modified Copies in Video," Visual Communications and Image Processing 2010, Proc. of SPIE vol. 7744, Jul. 11, 2010, 10 pgs.

Khodabakhshi et al., "Copy detection of 3D videos," In Proc. of ACM Multimedia Systems (MMSys'12) Conference, pp. 131-142, Feb. 2012, 12 pgs.

Silpa-Anan and R. Hartley, "Optimised KD-Trees for Fast Image Descriptor Matching," In Proc. of IEEE Conference on Computer Vision and Pattern Recognition, pp. 1-8, Anchorage, AL, Jun. 2008, 8 pgs.

\* cited by examiner

SYSTEM AND METHOD FOR MULTIMEDIA CONTENT PROTECTION ON CLOUD INFRASTRUCTURES

This is a National Phase Application under 35 USC 371 of PCT/EP2012/068781 filed Sep. 24, 2012 (published on Mar. 27, 2014 as WO 2014/044331), which is incorporated herein by reference.

DESCRIPTION OF INVENTION

This invention relates to the detection of duplicated content using cloud systems, and more particularly to a system and method for the detection of duplicated, copyright material in an online environment.

BACKGROUND

Advances in processing and recording equipment of multimedia contents as well as the availability of free online hosting sites have made it relatively easy to illegally duplicate copyrighted materials such as videos, songs, images, and music clips. Copying and illegally redistributing multimedia contents over the Internet can result in significant loss of revenues for content creators. Finding illegally-made copies over the Internet is a complex and computationally expensive operation, on account of the huge numbers of available multimedia content items across the Internet and the complexity involved in comparing content items to identify copies.

The present invention seeks to provide a novel system and method for multimedia content protection on cloud infrastructures. The system and method can be used to protect various multimedia contents, including regular 2D videos, new 3D videos, animated graphics, images, audios clips, songs, and music clips, and can run on private clouds, public clouds, or any combination of public-private clouds.

Techniques for video copy detection are disclosed in N. Khodabakhshi and M. Hefeeda, Copy detection of 3D videos, In Proc. of ACM Multimedia Systems (MMSys'12) Conference, pp. 131-142, February 2012, Chapel Hill, N.C., USA, J. Bentley, Multidimensional Binary Search Trees used for Associative Searching, Communications of the ACM, vol 18, No 9, pp. 509-517, 1975 and C. Silpa-Anan and R. Hartley, Optimized KD Trees for Fast Image Descriptor Matching, In Proc. of IEEE Conference on Computer Vision and Pattern Recognition, pp. 1-8, Anchorage, AL, June 2008

US2010/0318759 discloses a distributed backup storage which supports differential compression. It does not provide a distributed index for performing fast nearest neighbour searches.

US2011/0064262 discloses attempts to protect 3D videos (videos consist of a base view and an enhancement view) by identifying regions in base and/or enhancement pictures that are not referenced by other pictures in the compressed 3D video. Then, these regions are watermarked and transmitted. Receivers of water-marked videos extract and verify the embedded watermarks.

US2008/0313140 discloses a method and apparatus for multi-dimensional content search and video identification which utilises multidimensional databases and indexes to search different structures such as videos. To do this, a compact hash of multidimensional vector signatures is used as the traversal index. For video search applications, global and local signatures around key points are used as discriminative information of the videos. To find matches, a likelihood score based on frame similarity is computed between the frames of a query video and original videos. Then, a correlation between the query video and original videos is generated by using a change in signatures of each sequence of frames in the query video and original videos.

US2008/0178302 discloses the use of video fingerprints to determine 2D video copies.

The present invention provides a method for detecting copies of online multimedia content over distributed systems, the method comprising the steps of identifying multimedia content to be used as the basis for copy detection, calculating the resources required to extract features from the multimedia content, obtaining and deploying the required resources, extracting features from the multimedia content to form signature data, the signature data relating to the extracted features, inputting the signature data into a distributed index, identifying online content to be processed for copy detection, calculating the further resources required to extract features from the online content to be processed, obtaining and deploying the required further resources, extracting features from the online content to form online content data signatures, comparing the signature data with the online content data signatures, and determining whether the online content is a copy of the multimedia content.

Preferably, the distributed system uses a cloud infrastructure.

Conveniently, the step of extracting features from the multimedia content is undertaken on a system in the control of the multimedia content owner.

Advantageously, the signature data includes at least one of a visual signature, an audio signature, a depth signature, and metadata.

Preferably, the metadata includes details of the content uploader.

Conveniently, the step of forming the signature data includes the formation of a composite signature comprised of a combination of at least two of: a visual signature, an audio signature, a depth signature, and metadata.

Advantageously, the step of identifying the online content to be processed comprises crawling the internet to locate multimedia content.

The present invention also provides a system for detecting copies of online multimedia content over distributed systems, the system including an item or items of multimedia content to be used as the basis for copy detection, a processor to calculate the resources required to extract features from the or each item of multimedia content, a resource, which when deployed, provides a platform on which to extract signature data from the multimedia content, a distributed index in which to store the signature data, online content to be processed for copy detection, a further resource, which when deployed, provides a platform on which to extract online content data signatures from the online content, and a data comparator, to compare the signature data and the online content data signatures, wherein the multimedia content is processed to extract signature data, the signature data is stored in the distributed index, and the data comparator receives signature data from the distributed index and compares it against the online content data signatures, to detect online copies of the multimedia content.

Preferably, the resource is a cloud infrastructure.

Conveniently, the further resource is a cloud infrastructure.

Alternatively, the resource used to process the multimedia content is in the control of the multimedia content owner.

Advantageously, the signature data includes at least one of a visual signature, an audio signature, a depth signature, and metadata.

Preferably, metadata includes details of the content uploader.

Conveniently, the signature data is formed of a composite signature.

Advantageously, the online content to be processed is identified crawling the internet to locate multimedia content.

Another aspect of the present invention provides a method of creating a composite signature, the method comprising the steps of calculating a visual signature, based on the visual parts in multimedia objects, calculating an audio signature, based on the audio signal in the multimedia objects, calculating a depth signature, determined based upon the depth of the multimedia object, collecting metadata, created from information associated with multimedia objects, and combining at least two of the visual signature, audio signature, depth signature, and metadata to form a composite signature.

A yet further aspect of the present invention provides a composite signature comprising a combination of at least two of: a visual signature, an audio signature, a depth signature, and metadata.

In order that the present invention may be more readily understood, embodiments of the present invention are described by way of example only, with reference to the accompanying figures, in which.

Figure 1:
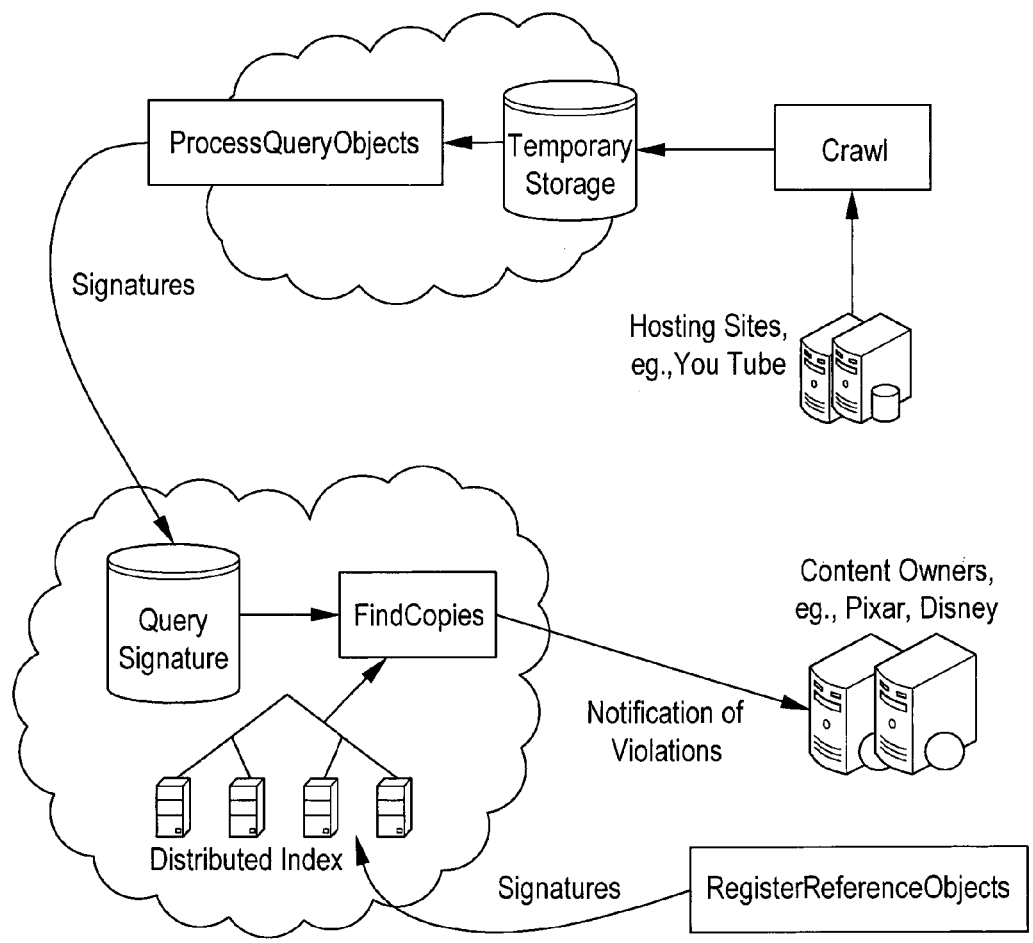
FIG. 1 shows an overview of the cloud-based content protection system and method of the present invention.

The cloud-based multimedia content protection system and method is shown in FIG. 1. The system has multiple components, with a large proportion of the components hosted on cloud infrastructures. In FIG. 1, a general case is shown, in which one or more cloud providers can be used by the system, because some cloud providers are more efficient and/or provide more cost saving for varying computing tasks. For example, a cloud provider offering lower cost for inbound bandwidth and storage may be used for downloading and temporarily storing videos from online sites (represented by the upper cloud in FIG. 1), while another cloud provider offering better compute nodes at lower costs may be used to maintain the distributed index and to perform the copy detection process (represented by the lower cloud in FIG. 1).

Generally, in the case of content protection systems, there may be three main parties involved, which may include content owners (the owners of the copyrighted materials that need to be protected), hosting sites (online web sites that allow users to upload multimedia contents), and providers of a content protection service (often third-party companies which offer a protection service to content owners).

In an effort to combat the unauthorised copying and distribution of online content, the present invention may be deployed and managed by any of the three parties. Firstly, content owners may deploy a protection system to protect their own content. Further, hosting sites may offer a protection service by checking their own repositories and reporting to content owners. Also, independent third-party companies may offer such protection as a service to content owners by periodically checking contents posted on online sites.

The present invention may include the following main components, as shown in FIG. 1:

A distributed index—this may maintain signatures of objects that need to be protected;

RegisterReferenceObjects component—this may create signatures from the objects that content owners are interested to protect and may insert them into the distributed index;

ProcessQueryObjects component—this may create signatures from objects downloaded from online sites, which are called query signatures, and may upload these signatures to a common storage;

FindCopies component—this may compare query signatures against reference signatures in the distributed index to find potential copies and may also send notifications to content owners if copies are found; and Crawl component—this may download multimedia content from various online hosting sites and store the content items in temporary storage.

The distributed index which maintains signatures of the reference objects may be stored and/or hosted on a cloud infrastructure. The index may provide fast comparison operations, and various data structures, such as KD trees may be used to implement the index.

The proposed cloud-based index may use varying amount of cloud computing resources on demand. For example, when comparing signatures in large batches, more machines can be requested from the cloud. Conversely, when there are few queries to process, a very few machines can be used to maintain the index. This leads to substantial saving of recurring operating costs. Further, the index can be scaled to support massive data sets.

Also, the index can be deployed quickly, because cloud computing resources can be configured quickly, and can tolerate failures in computing nodes.

The distributed index may be accessed by an interface, which may include the following modules:

Construct—this may build the index from a given set of signatures;

Lookup—if this is given a query signature, it may find the closest K neighbours to it;

mLookup—if this is given a set of signatures, it may find the closest K neighbours to each of the signatures, and processing of the signatures may be carried out in parallel on multiple nodes;

Insert—this may insert a new signature into the index;

mInsert—this may insert a set of signatures in the index in parallel;

Delete—this may delete a signature in the index;

mDelete—this may delete a set of signatures in the index in parallel; and

Scale—this may increase or decrease the size of the index to vary the number of data points held in the index.

The RegisterReferenceObjects and ProcessQueryObjects may share a common part, in that they create signatures from multimedia objects.

The RegisterReferenceObjects component may create signatures for objects that content owners desire to protect, which may be referred to as reference objects. The ProcessQueryObjects component may create signatures for objects downloaded from online sites, which may be referred to as query objects.

The RegisterReferenceObjects component may run as a separate application, and may run on servers on content owners' sites. In this case, the reference objects do not necessarily need to be transferred outside the content owners' premises. However, this may require content owners to deploy a number of servers to run this application. The RegisterReferenceObjects component may also run on a cloud infrastructure, which may require the transfer of reference objects to the cloud and some network costs may apply. In addition, the RegisterReferenceObjects component may insert the generated signatures into the distributed index.

The ProcessQueryObjects component may run as a separate application in a cloud infrastructure. It may create signatures for query objects stored on the cloud, and may upload them to the storage of query signatures. Query signatures may frequently change and may therefore not be inserted in the distributed indexed. Instead, they may be compared against reference signatures in the distributed index.

Reference signatures do not, in general, change frequently, because they are generally based on contractual agreements between the provider of the protection service and content owners. However, query objects may periodically (often in the order of hours) downloaded from online sites.

Query objects downloaded from online sites are generally stored only until their signatures have been created by the ProcessQueryObjects component. In case that the content protection system is offered by a hosting site, signatures may be created for the repository of that hosting site.

Both RegisterReferenceObjects and ProcessQueryObjects components may create composite (multi-modal) signatures from content objects. The content objects may be any type of multimedia contents, and may include 2D videos, 3D videos, images, songs, and music clips. Both RegisterReferenceObjects and ProcessQueryObjects components, in general, require extensive processing of multimedia objects. The present invention proposes composite signatures which may include the following:

A visual signature, which may be created based on the visual parts in multimedia objects (if they are present) and how the visual parts may change with time;

An audio signature, which may be created based on the audio signal in the multimedia objects (if they are present) and may be created using known techniques or a novel method;

A depth signature, which, if the or each multimedia objects are 3D, may be created from the perceived (or recorded) depth of the 3D multimedia object;

Associated metadata, which may be created from information associated with multimedia objects such as the file name, associated tags, the description of the content, the format of the content, and the IP addresses of their uploader or downloader or any other suitable attribute; and Any other suitable signature which may be generated from content data.

Figure 2:
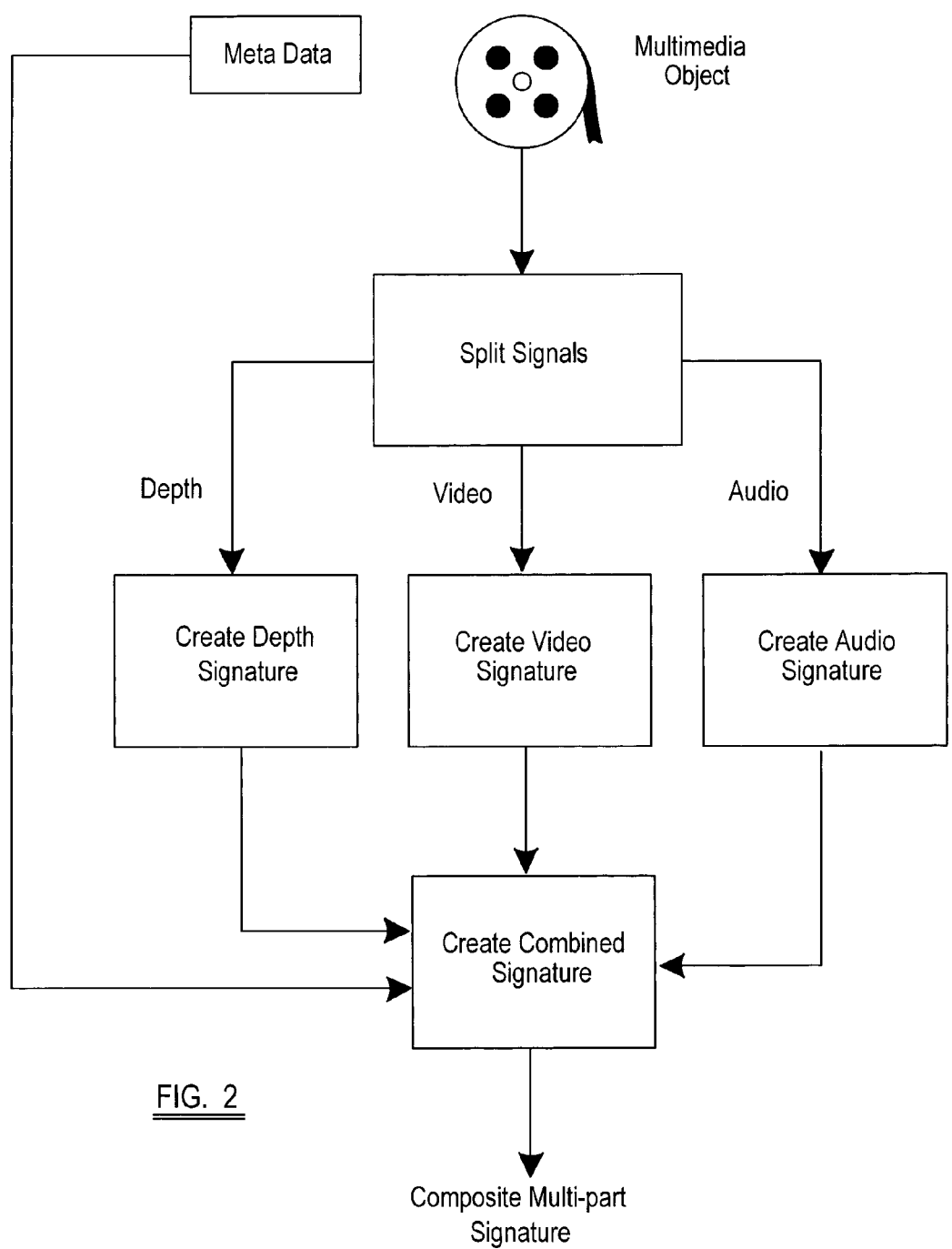
FIG. 2 shows an overview of the main steps involved in the composite signature creation of the present invention.

FIG. 2 shows the main steps involved in creating a composite signature, and a summary of each step is summarised in the below paragraphs.

The first step of the process is the Split Signals step. This step may process different types of multimedia objects, which may include 2D videos, 3D videos, songs, and music clips. Further, it may also be used to process different media compression methods and file formats. It may extract separate signals from the multimedia object, and each type of signal is handled differently.

The next step of the process is the Create Depth Signature step. If the multimedia object is 3D, then depth signal may be extracted if it is explicitly encoded with the object. If the depth signal is implicitly encoded, as is generally the case with stereo video content, a known or novel depth estimation method may be used, dependent upon the intended application of the present invention. The skilled person will appreciate that a number of methods exist which may be used.

One such method of creating a depth signature comprises analysing a pair of images, each image containing a plurality of elements, identifying a first element in one of the pair of images, and identifying plural elements in the other of the pair of images. The method further comprises measuring a disparity parameter between the first element and a set of the plural elements, matching the first element from the set of plural elements, the matched second element having the smallest measured disparity parameter, and computing a signature based at least in part on the measured disparity between the first and second elements.

Then, a Visual Signature may be created. If the multimedia object has visual parts, for instance in the case of videos and images, then visual features may be extracted from the video frames of the multimedia object. Once the visual features have been extracted, any suitable method may be employed to create the Visual Signature, for instance the method detailed in Khodabakhshi and Hefeeda. The skilled person will appreciate that any suitable method may be employed.

Next, an Audio Signature may be created. If the multimedia object has audio parts, as is the case with video with audio and songs, various methods for creating audio signatures may be used, again dependent upon the intended use.

Once the above signatures have been created, a Combined Signature may be created. This step may combine different signatures and may assign different weights to each of them. It may also analyse metadata associated with the multimedia object and may extract important information that can be used in the copy detection process. This important information may include (but is not limited to) the format of the object, the type of content, the number of downloads of the object, the IP address of the uploader, and any other suitable information.

It is to be understood that, with the exception of creating the Combined Signature, the above steps may be carried out in any suitable order, as will be understood by the skilled reader.

All of the above steps may be performed for each multimedia object. The RegisterReferenceObjects and ProcessQueryObjects components should be able to handle many objects at the same time, and therefore the present invention presents a distributed design for these components. The present invention uses cloud infrastructure in an elastic fashion, increasing and decreasing the resources used dependent upon the size of the system and the intended use. The elastic use of the cloud is allows for cost efficiency and fast processing.

Figure 3:
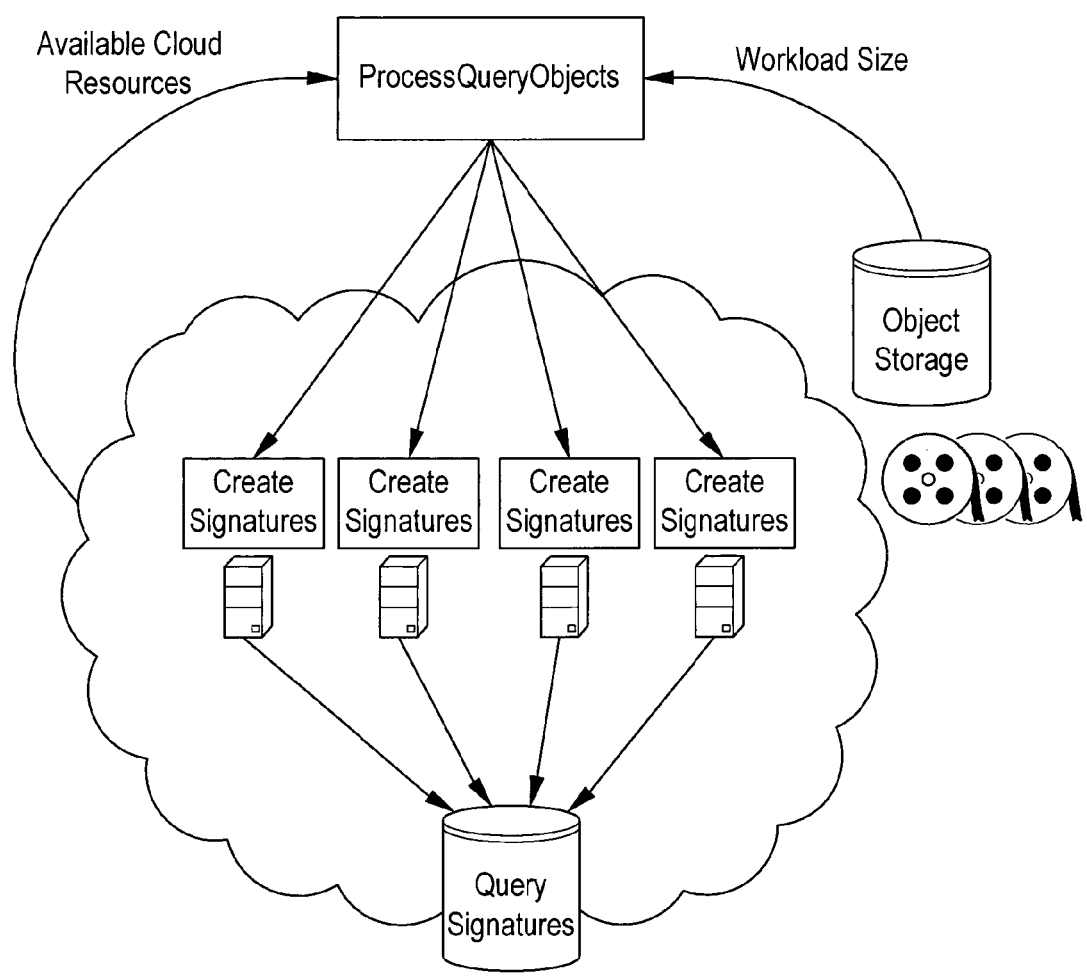
FIG. 3 shows key processing steps according to the present invention.

The distributed design for the present invention is set out in FIG. 3, and may include features as discussed below.

The distributed design may obtain information about the number of objects that need to be processed, which is the workload size, then may estimate the required resources to process the whole workload, within a specified completion time. When the required resources have been estimated, the process may then request computing resources from the cloud infrastructure.

Based on the returned computing resources and their configurations (e.g., number of nodes, and number of processor cores and memory size on each node), the process may then partition the workload and may allocate it to different computing nodes. On-line monitoring of the progress of each node may be performed and task reallocation may be undertaken if some nodes fail or lag behind. Each computing node may compute the composite signatures of the given multimedia objects using the steps set out above and shown in FIG. 2, and may then write the resulting signature on a common cloud storage.

The present invention presents a FindCopies component in addition to the above, which may compare the query signatures computed by the ProcessQueryObjects component versus the signatures stored in the distributed index, which may be created by the RegisterReferenceObjects component. The FindCopies component may use the interface provided by the distributed index.

Similar to the ProcessQueryObjects and RegisterReferenceObjects components, the FindCopies component may be computationally expensive, especially if the distributed index is large and there are many query signatures.

Therefore, the FindCopies component may run on elastic cloud infrastructures. This design is similar to the distributed design in FIG. 3, and it may first estimate the workload size based on the number of the query signatures and the current size of the distributed index. It may then request enough cloud computing resources to process this workload, then may allocate partitions of the query signatures to different computing nodes. Finally, if any copies are found, the corresponding content owners may be notified.

If the content protection system is being run by online hosting sites, then the Crawl component is not needed, since the objects are available on the hosting sites' archives. The Crawl component is needed if the system is run by the content owners or third-part companies providing the content protection service.

The number of multimedia objects added to hosting sites on a daily basis is huge. Therefore, the present invention may crawl the internet to find multimedia objects to be checked for copies, by way of a Crawl component.

Given that the potential online information to be crawled is very large, the Crawl component is designed efficiently. The Crawl component may run on cloud infrastructures. Similar to the previous three components, it may first request cloud resources to run multiple instances of the Crawl component. The different instances may download different multimedia objects, or alternatively, may all seek the same multimedia objects. The different instances of the Crawl component may be managed by a coordinator that may allocate download tasks to the different Crawl instances. To do so, the coordinator may contact various hosting sites and collects addresses and metadata associated with available multimedia objects.

Then, the coordinator may construct various queries and repeatedly contacts hosting sites to construct a master file containing unique objects that need to be downloaded. The queries constructed by the coordinator may be used to limit the scope of the objects that will be downloaded. For example, queries submitted by the coordinator may request objects that have been posted within a given time period, have certain lengths, have been watched more than given thresholds, uploaded or watched from certain geographic areas, or any other suitable criteria.

Once the master file is constructed, partitions of this file may be allocated to different Crawl instances. Then, each instance may start downloading objects allocated to it and may store them in cloud storage.

In use, a particular content object or collection of content objects to be used as the basis for copy detection would be identified, and signatures created which are unique to the or each content object, using the steps set out above. The cloud resources required would be estimated, and the required cloud resources would be procured, as set out in the discussions of the RegisterReferenceObjects and ProcessQueryObjects sections above.

Then, the signatures would be stored in common cloud storage, and the data regarding the content objects and the signatures, would be stored in a distributed index. If the copy detection is being run remotely (i.e. not on a hosted content provider's systems), the web (or other network) would be need to be crawled to find hosted content objects, using the Crawl method as detailed above. The located hosted content objects would then be analysed using FindCopies (again, as discussed above) to extract the signatures from the hosted content objects, using further cloud resources.

Then, the hosted content objects which have the same attributes (and signatures) as the identified content objects would be identified and flagged as potential copies, again using FindCopies.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. A method for detecting copies of multimedia content over distributed systems, the method comprising:
   identifying the multimedia content to be used as a basis for copy detection;
   calculating required resources to extract features from the multimedia content;
   obtaining and deploying the required resources;
   extracting the features from the multimedia content;
   forming multimedia content signature data from the extracted features of the multimedia content, the forming of the multimedia content signature data includes forming a composite signature of the multimedia content from at least two different signatures, the composite signature being formed by combining at least a portion of a visual signature, at least a portion of an audio signature, and at least a portion of metadata extracted from the multimedia content;
   inputting the multimedia content signature data into a distributed index;
   identifying online content to be processed for the copy detection;
   calculating further required resources to extract features from the online content to be processed;
   obtaining and deploying the further required resources;
   extracting the features from the online content;
   forming online content data signatures from the extracted features of the online content, the forming of the online content data signatures includes forming a composite signature of the online content from at least two different signatures, the composite signature being formed by combining at least a portion of a visual signature, at least a portion of an audio signature, and at least a portion of metadata extracted from the online content;
   comparing the composite signature of the multimedia content with the composite signature of the online content; and determining whether the online content is a copy of the multimedia content.

2. The method of claim 1, wherein the distributed systems use a cloud infrastructure.

3. The method of claim 1, wherein the extracting of the features from the multimedia content is undertaken on a system in the control of an owner of the multimedia content.

4. The method of claim 1, wherein the composite signature of the multimedia content further includes at least a portion of a depth signature of the multimedia content and the composite signature of the online content further includes at least a portion of a depth signature of the online content.

5. The method of claim 1, wherein the metadata of the online content includes details of a content uploader.

6. The method of claim 1, wherein the identifying of the online content to be processed includes crawling the internet to locate multimedia objects.

7. A system for detecting copies of multimedia content over distributed systems, the system comprising:
a processor configured to:
identify the multimedia content to be used as a basis for copy detection;
calculate required resources to extract features from the multimedia content;
obtain and deploy the required resources;
extract the features from the multimedia content;
form multimedia content signature data from the extracted features of the multimedia content, the formation of the multimedia content signature data includes forming a composite signature of the multimedia content from at least two different signatures, the composite signature being formed by combining at least a portion of a visual signature, at least a portion of an audio signature, and at least a portion of metadata extracted from the multimedia content;
input the multimedia content signature data into a distributed index;
identify online content to be processed for the copy detection;
calculate further required resources to extract features from the online content to be processed;
obtain and deploy the further required resources;
extract the features from the online content;
form online content data signatures from the extracted features of the online content, the forming of the online content data signatures includes forming a composite signature of the online content from at least two different signatures, the composite signature being formed by combining at least a portion of a visual signature, at least a portion of an audio signature, and at least a portion of metadata extracted from the online content;
compare the composite signature of the multimedia content with the composite signature of the online content; and
determine whether the online content is a copy of the multimedia content.

8. The system of claim 7, wherein the required resources are a cloud infrastructure.

9. The system of claim 7, wherein the further required resources are a cloud infrastructure.

10. The system of claim 7, wherein the processor is in the control of an owner of the multimedia content.

11. The system of claim 7, wherein the composite signature of the multimedia content further includes at least a portion of a depth signature of the multimedia content and the composite signature of the online content further includes at least a portion of a depth signature of the online content.

12. The system of claim 7, wherein the metadata of the online content includes details of a content uploader.

13. The system of claim 7, wherein the identification of the online content to be processed includes crawling the internet to locate multimedia objects.

14. A method of creating a composite signature of multimedia objects from at least two different signatures, the method comprising:
calculating a visual signature based on visual parts in the multimedia objects;
calculating an audio signature based on an audio signal in the multimedia objects;
calculating a depth signature based on a depth of the multimedia objects;
collecting metadata created from information associated with the multimedia objects; and
combining at least a portion of the visual signature, at least a portion of the audio signature, and at least a portion of the metadata of the multimedia objects to form the composite signature of the multimedia objects.

15. The method of claim 14, wherein the composite signature of the multimedia objects includes at least a portion of the depth signature of the multimedia objects.

* * * * *